United States Patent
Noh et al.

(10) Patent No.: US 10,516,495 B2
(45) Date of Patent: Dec. 24, 2019

(54) METHOD FOR MEASURING INTER-DEVICE INTERFERENCE IN WIRELESS COMMUNICATION SYSTEM SUPPORTING FDR TRANSMISSION, AND APPARATUS THEREFOR

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 15/519,805

(22) PCT Filed: Oct. 14, 2015

(86) PCT No.: PCT/KR2015/010834
§ 371 (c)(1),
(2) Date: Apr. 17, 2017

(87) PCT Pub. No.: WO2016/060466
PCT Pub. Date: Apr. 21, 2016

(65) Prior Publication Data
US 2017/0257177 A1 Sep. 7, 2017

Related U.S. Application Data

(60) Provisional application No. 62/065,607, filed on Oct. 17, 2014.

(51) Int. Cl.
*H04B 17/345* (2015.01)
*H04W 24/08* (2009.01)
(Continued)

(52) U.S. Cl.
CPC .......... *H04B 17/345* (2015.01); *H04J 11/003* (2013.01); *H04L 5/0051* (2013.01);
(Continued)

(58) Field of Classification Search
CPC ....... H04B 17/345; H04L 5/14; H04L 5/0051; H04L 5/0073; H04W 24/08; H04W 24/10; H04J 11/003
(Continued)

(56) References Cited

U.S. PATENT DOCUMENTS

2012/0315859 A1* 12/2012 Lee, II ................... H04J 11/005
455/67.13
2013/0281143 A1* 10/2013 Nentwig ........... H04W 72/1231
455/501
(Continued)

FOREIGN PATENT DOCUMENTS

| KR | 20140078236 | * | 6/2014 |
| WO | 2014092365 | | 6/2014 |
| WO | 2014098407 | | 6/2014 |

OTHER PUBLICATIONS

PCT International Application No. PCT/KR2015/010834, Written Opinion of the International Searching Authority dated Jan. 27, 2016, 28 pages.

*Primary Examiner* — Faisal Choudhury
(74) *Attorney, Agent, or Firm* — Lee, Hong, Degerman, Kang & Waimey PC

(57) ABSTRACT

The present invention relates to a wireless access system supporting a full duplex radio (FDR) transmission environment. A method for a terminal to measure interference in a wireless communication system supporting FDR according to an embodiment of the present invention comprises the steps of: receiving an interference measurement resource at a measurement subframe; and measuring, at the interference measurement resource, interference from a neighboring ter- (Continued)

minal on the basis of an interference reference signal transmitted from the neighboring terminal. In addition, data is not transmitted or is transmitted with zero-power in the interference measurement resource.

8 Claims, 14 Drawing Sheets

(51) Int. Cl.
    *H04L 5/14*     (2006.01)
    *H04W 24/10*     (2009.01)
    *H04J 11/00*     (2006.01)
    *H04L 5/00*     (2006.01)

(52) U.S. Cl.
    CPC .............. *H04L 5/0073* (2013.01); *H04L 5/14* (2013.01); *H04W 24/08* (2013.01); *H04W 24/10* (2013.01)

(58) Field of Classification Search
    USPC ......................................................... 370/252
    See application file for complete search history.

(56) References Cited

U.S. PATENT DOCUMENTS

| | | | |
|---|---|---|---|
| 2013/0343241 A1 | 12/2013 | Niu et al. | |
| 2014/0169234 A1* | 6/2014 | Zhu ..................... | H04W 72/082 370/277 |
| 2014/0204807 A1* | 7/2014 | Li .......................... | H04B 1/50 370/277 |
| 2014/0307576 A1 | 10/2014 | Nagata et al. | |
| 2016/0013906 A1* | 1/2016 | Guo ...................... | H04L 5/0048 370/329 |
| 2016/0065350 A1* | 3/2016 | Suzuki ................. | H04W 28/18 370/329 |
| 2016/0080963 A1* | 3/2016 | Marinier .............. | H04L 5/0053 370/252 |
| 2016/0248553 A1* | 8/2016 | Shimezawa ............... | H04L 5/14 |
| 2017/0005770 A1* | 1/2017 | Shimezawa ............. | H04L 5/001 |
| 2017/0026073 A1* | 1/2017 | Liu .......................... | H04B 1/50 |
| 2017/0163404 A1* | 6/2017 | Liu .......................... | H04L 5/14 |

* cited by examiner

FIG. 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5
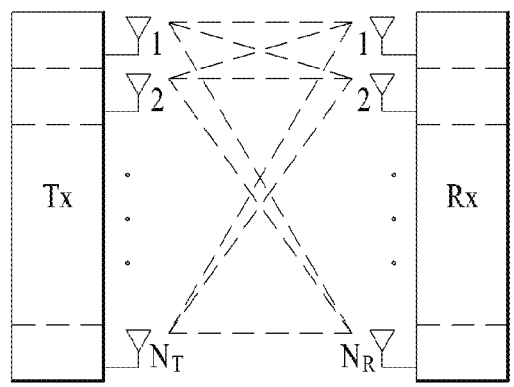
(a)
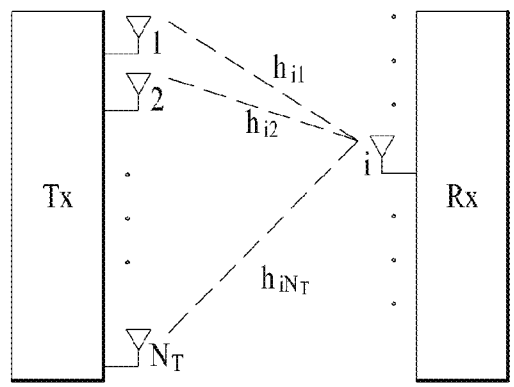
(b)

FIG. 13

|  |  | subframe | | | | |
|---|---|---|---|---|---|---|
|  |  | #0 | #1 | #2 | #3 | #4 |
| Measuring UE | a | UL | DL | DL | DL | DL |
|  | b | DL | UL | DL | DL | DL |
|  | c | DL | DL | UL | DL | DL |
|  | d | DL | DL | DL | UL | DL |
|  | e | DL | DL | DL | DL | UL |

FIG. 14
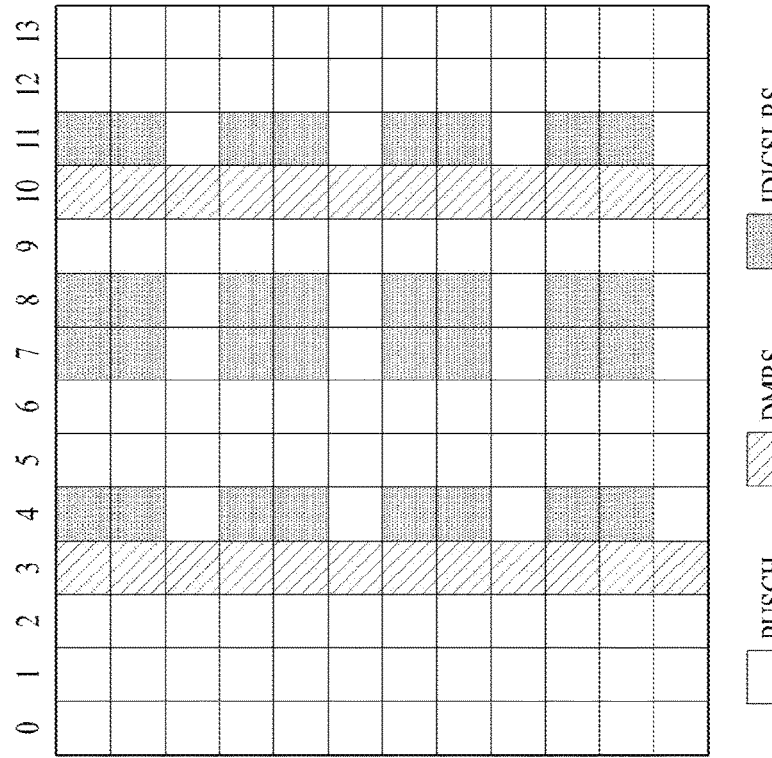
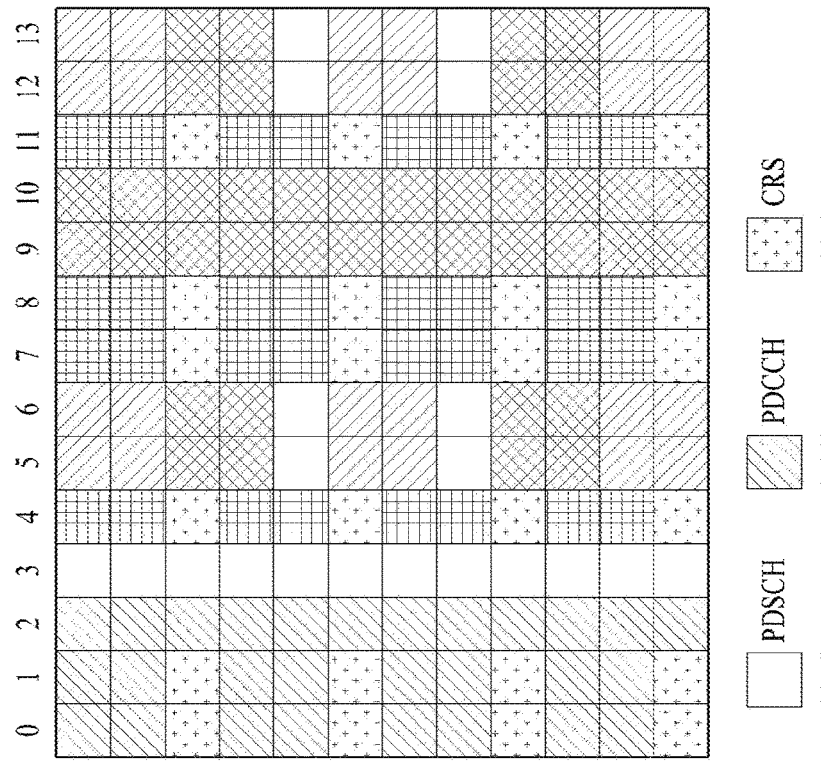

FIG. 15

| configuration | subframe number | | | | | | | | | |
|---|---|---|---|---|---|---|---|---|---|---|
| | 0 | 1 | 2 | 3 | 4 | 5 | 6 | 7 | 8 | 9 |
| 3 | D | S | U | U | U | D | D | D | D | D |
| 4 | D | S | U | U | D | D | D | D | D | D |
| 5 | D | S | U | D | D | D | D | D | D | D |

(a)

| subframe number | | | | | | | | | | |
|---|---|---|---|---|---|---|---|---|---|---|
| 0 | 1 | 2 | 3 | 4 | 5 | 6 | 7 | 8 | 9 |
| D | S | U | U | U | D | D | D | D | D |
| D | D | D | D | S | U | U | D | D | D |
| D | D | D | D | D | D | S | U | D | D |

(b)

METHOD FOR MEASURING INTER-DEVICE INTERFERENCE IN WIRELESS COMMUNICATION SYSTEM SUPPORTING FDR TRANSMISSION, AND APPARATUS THEREFOR

CROSS-REFERENCE TO RELATED APPLICATIONS

This application is the National Stage filing under 35 U.S.C. 371 of International Application No. PCT/KR2015/010834, filed on Oct. 14, 2015, which claims the benefit of U.S. Provisional Application No. 62/065,607, filed on Oct. 17, 2014, the contents of which are all hereby incorporated by reference herein in their entirety.

TECHNICAL FIELD

The present invention relates to a wireless communication system, and more particularly, to a method for measuring inter-device interference (IDI) in a full-duplex wireless communication system and apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency-division multiple access (SC-FDMA) system.

DISCLOSURE OF THE INVENTION

Technical Task

A technical task of the present invention is to provide a method for efficiently measuring IDI in a full-duplex wireless communication system and apparatus therefor.

Another technical task of the present invention is a method for designing a signal for efficient IDI measurement and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

A technical task of the present invention is to provide a method for efficiently measuring IDI in a full-duplex wireless communication system and apparatus therefor.

Another technical task of the present invention is a method for designing a signal for efficient IDI measurement and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Advantageous Effects

In a first aspect of the present invention, provided herein is a method for measuring inter-device interference (IDI) by a user equipment (UE) in a wireless communication system supporting full duplex radio (FDR), including: receiving an interference measurement resource in a measurement subframe; and measuring the IDI based on an interference reference signal, which is transmitted by a neighboring UE on the interference measurement resource. In this case, data may not be transmitted or transmitted with zero power on the interference measurement resource.

Additionally, the measurement subframe may be a downlink subframe and the interference measurement resource may be located in a data region.

In a second aspect of the present invention, provided herein is a method for transmitting a reference signal for inter-device interference (IDI) measurement by a user equipment (UE) in a wireless communication system supporting full duplex radio (FDR), including: mapping an interference reference signal for interference measurement to an uplink subframe according to interference reference resource configuration information; and transmitting the interference reference signal mapped to the uplink subframe to another UE. In this case, an interference reference resource may be located at the same position as that of an interference measurement resource, which is used by the another UE to measure interference.

In a third aspect of the present invention, provided herein is a user equipment (UE) for measuring inter-device interference in a wireless communication system supporting full duplex radio (FDR), including: a transceiver module configured to transmit and receive signals to and from a UE or a base station (BS); and a processor. In this case, the processor may be configured to control the transceiver module to receive an interference measurement resource in a measurement subframe and measure interference from a neighboring UE based on an interference reference signal, which is transmitted by the neighboring UE on the interference measurement resource. In addition, data may not be transmitted or transmitted with zero power on the interference measurement resource.

In a fourth aspect of the present invention, provided herein is a user equipment (UE) for transmitting a reference signal for inter-device interference (IDI) measurement in a wireless communication system supporting full duplex radio (FDR), including: a transceiver module configured to transmit and receive signals to and from a UE or a base station (BS); and a processor. In this case, the processor may be configured to map an interference reference signal for interference measurement to an uplink subframe according to interference reference resource configuration information and control the transceiver module to transmit the interference reference signal mapped to the uplink subframe to another UE. In addition, an interference reference resource may be located at the same position as that of an interference measurement resource, which is used by a neighboring UE to measure interference.

The following items can be commonly applied to the first to fourth aspects of the present invention.

The interference measurement resource or the interference reference measurement may be mapped to a resource region except a resource to which a reference signal for downlink measurement is mapped.

The interference measurement resource or the interference reference measurement may be mapped to at least one symbol on a time axis among remaining symbols except a symbol to which a demodulation reference signal or a channel state information reference signal is mapped.

The interference measurement resource or the interference reference measurement may be mapped to at least one subcarrier on a frequency axis among remaining subcarriers except a subcarrier to which a common reference signal is mapped.

The interference reference signal for the IDI measurement may be transmitted at a position of the interference measurement resource.

The measurement subframe may be an uplink subframe located prior to a special subframe.

DESCRIPTION OF DRAWINGS

FIG. 2 illustrates exemplary frame configurations for the radio frame structure shown in FIG. 1.

FIG. 5 is a diagram illustrating a configuration of a wireless communication system supporting multiple antennas.

FIG. 13 is a diagram for explaining an exemplary IDI measurement method applicable to the present invention.

FIG. 14 is a diagram for explaining resources for interference measurement applicable to an embodiment of the present invention.

FIG. 15 is a diagram illustrating frame configurations for an interference measurement method according to another embodiment of the present invention.

BEST MODE FOR INVENTION

Figure 1:
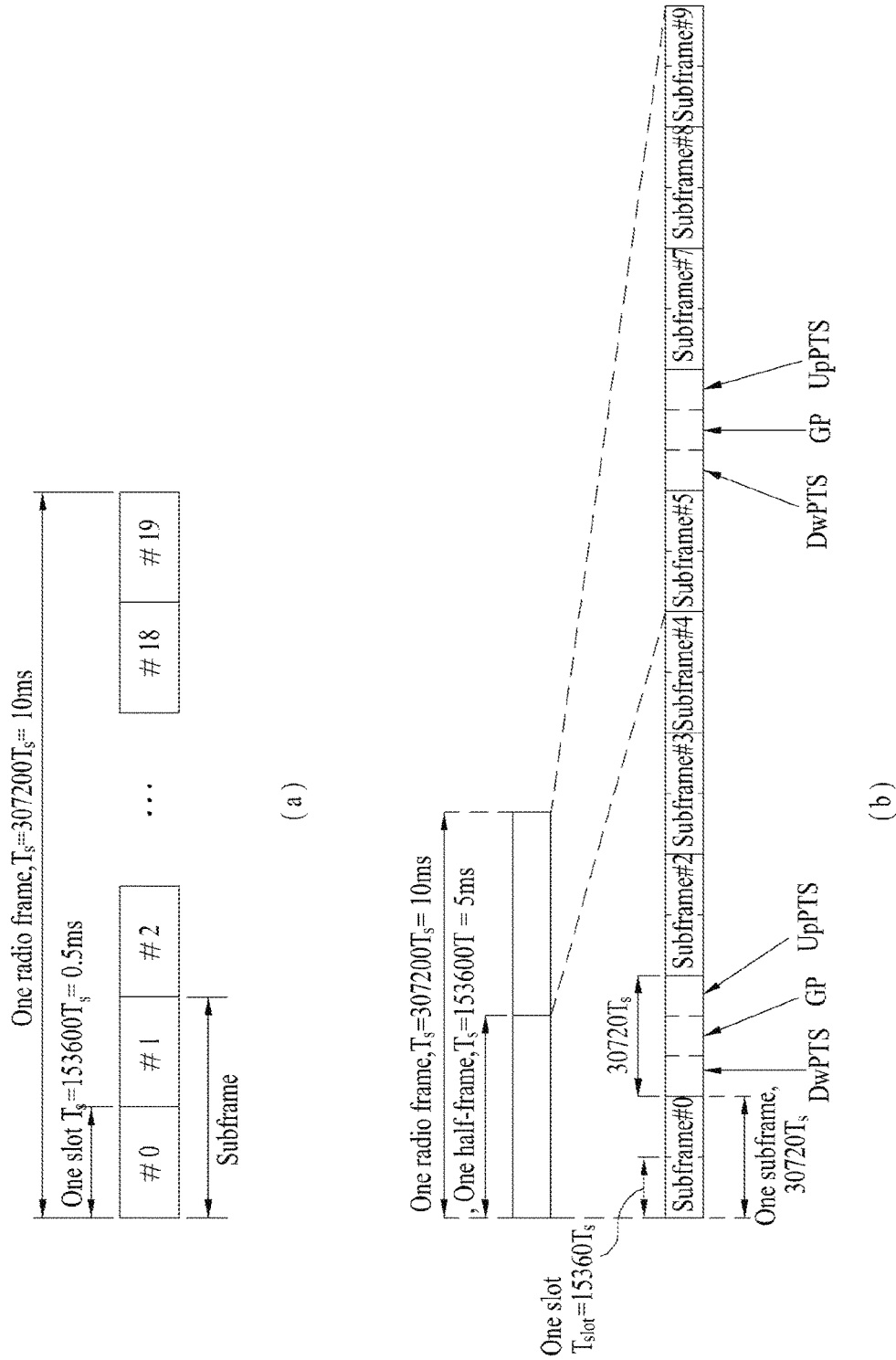
FIG. 1 illustrates a structure of a radio frame used in the 3GPP LTE system.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

The embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

Hereinafter, a radio frame structure in 3GPP LTE (-A) will be described with reference to FIG. 1. In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols.

FIG. 1(b) illustrates the frame structure type 2. The frame structure type 2 is applied to a time division duplex (TDD) system. One radio frame has a length of 10 ms (i.e., $T_f=307200 \cdot T_s$), including two half-frames each having a length of 5 ms (i.e., $153600 \cdot T_s$). Each half-frame includes five subframes each having a length of 1 ms (i.e., $30720 \cdot T_s$). An $i^{th}$ subframe includes $(2i)^{th}$ and $(2i+1)^{th}$ slots each having a length of 0.5 ms (i.e., $T_{slot}=15360 \cdot T_s$) where $T_s$ is a sampling time given as $T_s=1/(15 \text{ kHz} \times 2048)=3.2552 \times 10^{-8}$ (i.e., about 33 ns).

A type-2 frame includes a special subframe having three fields of downlink pilot time slot (DwPTS), guard period (GP), and uplink pilot time slot (UpPTS). The DwPTS is used for initial cell search, synchronization, or channel estimation at a UE and the UpPTS is used for channel estimation and UL transmission synchronization with a UE at an eNB. The GP is used to cancel UL interference between UL and DL, caused by the multi-path delay of a DL signal. The DwPTS, GP and UpPTS is included in the special subframe of Table 1.

FIG. 2 illustrates examples of frame configurations of the radio frame structure in FIG. 1.

In FIG. 2, 'D' represents a subframe for DL transmission, 'U' represents a subframe for UL transmission, and 'S' represents a special subframe for a guard time.

All UEs in each cell have one common frame configuration among the configurations shown in FIG. 2. That is, since a frame configuration is changed depending on a cell, the frame configuration may be referred to as a cell-specific configuration.

Figure 3:
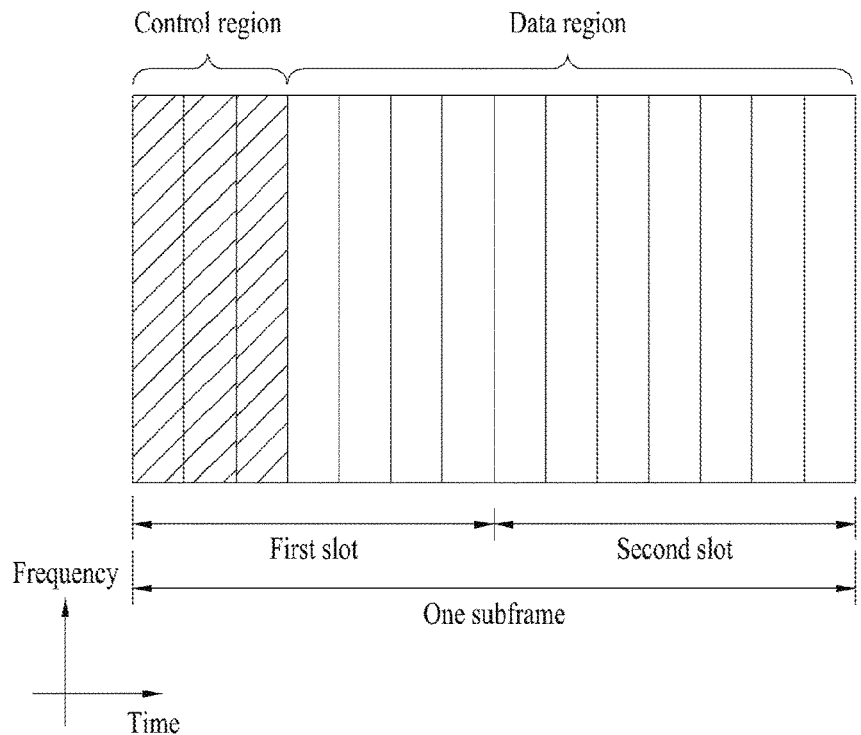
FIG. 3 is a diagram illustrating a downlink subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
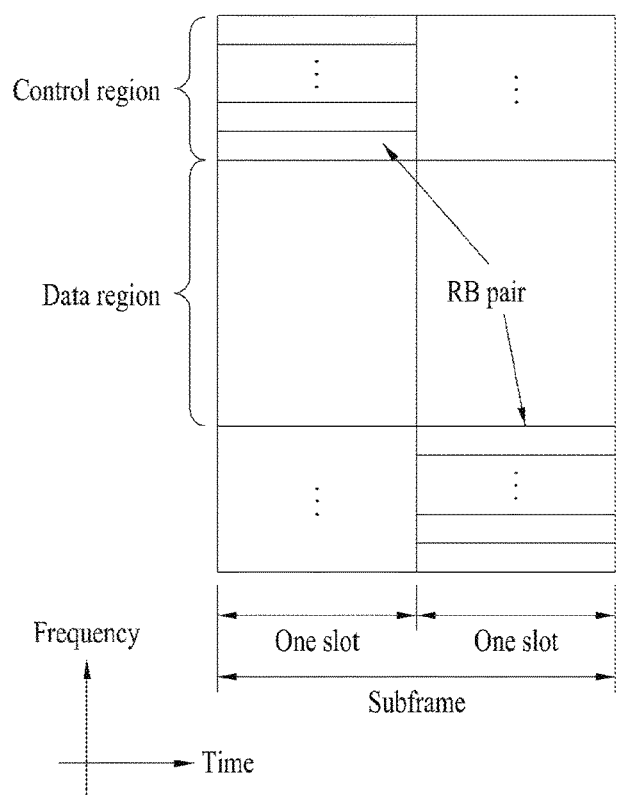
FIG. 4 is a diagram illustrating an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Modeling of Multiple Input Multiple Output (MIMO) System

An MIMO system improves data transmission/reception efficiency using multiple transmitting antennas and multiple receiving antennas. According to the MIMO technology, entire data can be received by combining a plurality of pieces of data received through a plurality of antennas instead of using a single antenna path to receive a whole message.

The MIMO technology can be classified into a spatial diversity scheme and a spatial multiplexing scheme. Since the spatial diversity scheme increases transmission reliability or a cell radius through a diversity gain, it is suitable for data transmission at a fast moving UE. According to the spatial multiplexing scheme, different data are simultaneously transmitted and thus a high data transfer rate can be achieved without increasing a system bandwidth.

FIG. 5 is a diagram illustrating a configuration of a wireless communication system having multiple antennas. As shown in FIG. 5(a), if the number of transmitting antennas is increased to NT and the number of receiving antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate R0 upon utilization of a single antenna and a rate increase ratio Ri.

Equation 1

$$R_i = \min(N_T, N_R) \quad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Communication in the MIMO system will be described in detail through mathematical modeling. It is assumed that the system has NT transmitting antennas and NR receiving antennas.

Regarding a transmitted signal, since up to NT pieces of information can be transmitted through the NT transmitting antennas, the transmitted signal can be expressed as Equation 2 below.

Equation 2

$$s = [s_1, s_2, \ldots, s_{N_T}]^T \quad \text{[Equation 2]}$$

Meanwhile, for each of the transmission information $s_1, s_2, \ldots, s_{N_T}$, a transmit power may be differentiated according to the each of the transmission information. In this case, if each of the transmit powers is represented as $P_1, P_2, \ldots, P_{N_T}$, transmit power-adjusted transmission information can be represented as a vector in the following Equation 3.

Equation 3

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, if $\hat{s}$ is represented using a diagonal matrix P, it can be represented as the following Equation 4.

Equation 4

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5.

Equation 5

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, $W_{ij}$ means a weighting between an $i^{th}$ transmitting antenna and $j^{th}$ information. The W is called the weight matrix or a precoding matrix.

The transmitted signal x may be differently processed based on two different schemes (for example, spatial diversity scheme and spatial multiplexing scheme). According to spatial multiplexing scheme, different signals are multiplexed and transmitted to a receiver such that elements of information vector(s) have different values. On the other hand, according to the spatial diversity scheme, the same signal is repeatedly transmitted through a plurality of channel paths such that elements of information vector(s) have the same value. The spatial multiplexing scheme and the spatial diversity scheme may be used in combination. For example, the same signal may be transmitted through three transmitting antennas according to the spatial diversity scheme and the remaining signals may be transmitted to the receiver according to the spatial multiplexing scheme.

In addition, signals $y_1, y_2, \ldots, y_{N_R}$ received at the $N_R$ receiving antennas can be expressed as Equation 6.

Equation 6

$$y = [y_1, y_2, \ldots, y_{N_R}]^T \quad \text{[Equation 6]}$$

If channels are modeled in the MIMO wireless communication system, the channels can be distinguished according to transmitting/receiving antenna indexes. A channel from a transmitting antenna j to a receiving antenna i is denoted by $h_{ij}$. In $h_{ij}$, it is noted that a receiving antenna index precedes a transmitting antenna index in order of indices.

FIG. 5(b) illustrates channels from the $N_T$ transmitting antennas to the receiving antenna i. The channels may be combined and expressed in the form of a vector and a matrix. In FIG. 5(b), the channels from the $N_T$ transmitting antennas to the receiving antenna i may be expressed as shown in Equation 7.

Equation 7

$$h_i^T = [h_{i1}, h_{i2}, \ldots, h_{iN_T}] \quad \text{[Equation 7]}$$

Accordingly, all the channels from the $N_T$ transmitting antennas to the $N_R$ receiving antennas can be expressed as shown in Equation 8.

Equation 8

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An Additive White Gaussian Noise (AWGN) is added to the actual channels after a channel matrix H. The AWGN $n_1, n_2, \ldots, n_{N_R}$ respectively added to the $N_R$ receiving antennas can be expressed as shown in Equation 9.

Equation 9

$$n = [n_1, n_2, \ldots, n_{N_R}]^T \quad \text{[Equation 9]}$$

Through the above-described mathematical modeling, the received signals can be expressed as shown in Equation 10.

Equation 10

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of the channel matrix H indicating a channel state is determined by the number of the transmitting and receiving antennas. The number of the rows of the channel matrix H is equal to $N_R$, i.e., the number of the receiving antennas and the number of the columns thereof is equal to $N_T$, i.e. the number of the transmitting antennas. That is, the channel matrix H is an $N_R \times N_T$ matrix.

A rank of a matrix is defined by the smaller of the number of rows or columns, which are independent of each other. Accordingly, the rank of the matrix is not greater than the number of rows or columns. The rank rank(H) of the channel matrix H is restricted as follows.

Equation 11

$$\text{rank}(H) \leq \min(N_T, N_R) \quad \text{[Equation 11]}$$

In MIMO transmission, the term 'rank' denotes the number of paths for independently transmitting signals, and the term 'number of layers' denotes the number of signal streams transmitted through each path. In general, since a transmitting end transmits layers corresponding in number to the number of ranks used for signal transmission, rank has the same meaning as the number of layers unless otherwise specified.

Meanwhile, a transmitter in the MIMO system may be configured to include an encoder, a modulation mapper, a layer mapper, a precoder, a resource element mapper, and an OFDM signal generator. In addition, the transmitter may include NT transmitting antennas.

The encoder generates coded data by encoding input data according to a predetermined coding scheme. The modulation mapper maps the coded data to modulation symbols that represent positions on a signal constellation. There is no limitation in a modulation scheme and the modulation scheme may be m-phase shift keying (m-PSK) or m-quadrature amplitude modulation (m-QAM). For example, the m-PSK may be BPSK, QPSK, or 8-PSK and the m-QAM may be 16-QAM, 64-QAM, or 256-QAM.

The layer mapper defines layers of the modulation symbols such that the precoder can distribute antenna-specific symbols to paths of the respective antennas. In this case, the layers are defined as information paths inputted to the precoder. Information paths before the precoder may be referred to as virtual antennas or layers.

The precoder processes the modulation symbols according to a MIMO scheme based on multiple transmitting antennas to output the antenna-specific symbols. The precoder distributes the antenna-specific symbols to the resource element mappers in the paths of corresponding antennas. Each information path sent to a single antenna by the precoder is called a stream, which may be called a physical antenna.

The resource element mapper allocates the antenna-specific symbols to proper resource elements and the mapped antenna-specific symbols are multiplexed according to a user. The OFDM signal generator modulates the antenna-specific symbols according to an OFDM scheme and outputs OFDM symbols. The OFDM signal generator may perform Inverse Fast Fourier Transform (IFFT) on the antenna-specific symbols. In addition, a cyclic prefix (CP) may be inserted into a time domain symbol where the IFFT is performed. Here, the CP may mean a signal included in a guard interval to cancel inter-symbol interference caused by multiple paths in an OFDM-based transmission scheme. The above-mentioned OFDM symbols are transmitted through the respective transmitting antennas.

Reference Signal (RS)

Since a packet is transmitted on a radio channel in a wireless communication system, a signal may be distorted in the course of transmission. A receiving end needs to correct the distorted signal using channel information to receive a correct signal. To enable the receiving end to obtain the channel information, a transmitting end transmits a signal known to both a transmitting end and the receiving end. The receiving end obtains the channel information based on the degree of distortion occurring when the signal is received on the radio channel. Such a signal is called a pilot signal or a reference signal.

When data is transmitted and received through multiple antennas, the receiving ends needs to be aware of a channel state between each transmitting antenna and each receiving antenna to receive the data correctively. Accordingly, each transmitting antenna should have a separate reference signal.

In a mobile communication system, reference signals (RSs) are mainly classified into two types according to the purposes thereof: an RS for channel information acquisition and an RS for data demodulation. Since the former RS is used to allow a UE to acquire DL channel information, it should be transmitted over a wide band. In addition, even a UE which does not receive DL data in a specific subframe should be receive and measure the corresponding RS. Such an RS is also used for measurement of handover. The latter RS is transmitted when an eNB sends a resource in downlink. The UE may perform channel estimation by receiving this RS, thereby performing data modulation. Such an RS should be transmitted in a region in which data is transmitted.

The legacy 3GPP LTE (e.g., 3GPP LTE release-8) system defines two types of downlink RSs for unicast services: a common RS (CRS) and a dedicated RS (DRS). The CRS is used for acquisition of information on a channel state, measurement of handover, etc. and may be referred to as a cell-specific RS. The DRS is used for data demodulation and may be referred to as a UE-specific RS. In the legacy 3GPP LTE system, the DRS is used for data demodulation only and the CRS can be used for both purposes of channel information acquisition and data demodulation.

The CRS, which is cell-specific, is transmitted across a wideband in every subframe. Depending on the number of transmitting antennas of the eNB, it is possible to transmit CRSs for maximum four antenna ports. For instance, when the number of the transmitting antennas of the eNB is two, CRS for antenna ports 0 and 1 are transmitted. If the eNB has four transmitting antennas, CRSs for antenna ports 0 to 3 are transmitted.

Figure 6:
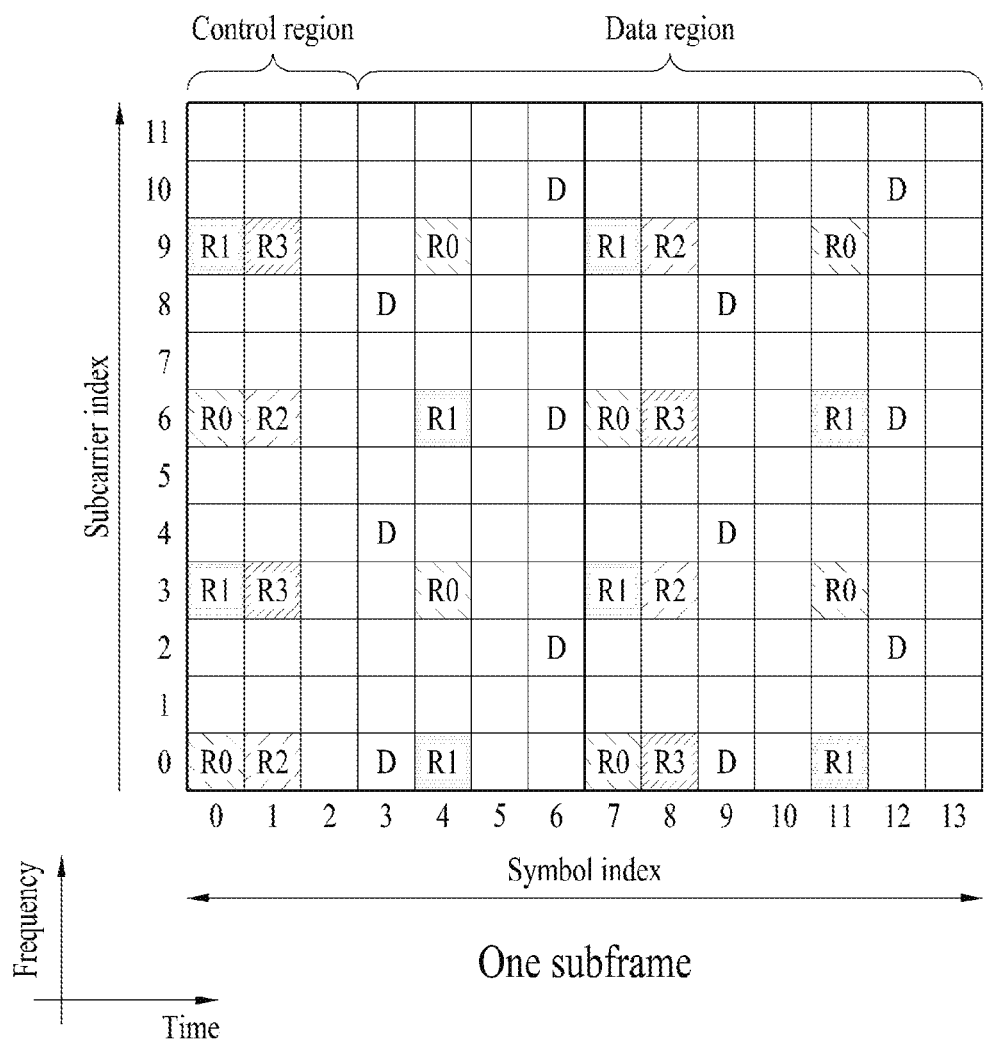
FIG. 6 illustrates an exemplary pattern for a CRS and a DRS in one resource block.

FIG. 6 illustrates CRS and DRS patterns for one resource block in a system where an eNB has four transmitting antennas (in case of a normal CP, one resource block includes 14 OFDM symbols in the time domain×12 subcarriers in the frequency domain). In FIG. 6, REs expressed as 'R0', 'R1', 'R2' and 'R3' respectively represent the positions of CRSs for antenna ports 0, 1, 2, and 3 and REs expressed as 'D' represent the positions of DRSs defined in the LTE system.

The LTE-A system, which is an evolved version of the LTE system, can support a maximum of 8 transmitting antennas on downlink. Accordingly, RSs for up to 8 transmitting antennas should be supported. Since downlink RSs are defined for up to four antenna ports in the LTE system, RSs for added antenna ports should be defined when the eNB has more than 4 up to 8 downlink transmitting antennas. As the RSs for a maximum of 8 transmitting antenna ports, both RSs for channel measurement and RSs for data demodulation should be considered.

One important consideration in design of the LTE-A system is backward compatibility. The backward compatibility refers to support of a legacy LTE UE that can properly operate in the LTE-A system. In terms of RS transmission, if RSs for up to 8 transmitting antenna ports are added in a time-frequency region in which CRSs defined in LTE standards are transmitted in every subframe over all bands, RS overhead excessively increases. Hence, when RSs for up to 8 antenna ports are designed, reduction of RS overhead should be considered.

The RSs newly introduced in the LTE-A system may be categorized into two types. One is a channel state information RS (CSI-RS) for channel measurement in order to select a transmission rank, a modulation and coding scheme (MCS), a precoding matrix index (PMI), etc. and the other is a modulation RS (DM RS) used for demodulating data transmitted through a maximum of 8 transmitting antennas.

The CSI-RS for channel measurement is mainly designed for channel measurement as opposed to the CRS in the legacy LTE system, used for channel measurement and handover measurement and simultaneously for data demodulation. Obviously, the CSI-RS may also be used for handover measurement. Since the CSI-RS is transmitted only for information acquisition on a channel state, the CSI-RS does not need to be transmitted in every subframe unlike the CRS in the legacy LTE system. Hence, to reduce CRS-RS overhead, the CSI-RS may be designated to be intermittently (e.g. periodically) transmitted in the time domain.

If data is transmitted in a certain downlink subframe, a dedicated DM RS is transmitted to a UE in which data transmission is scheduled. A DM RS dedicated to a specific UE may be designed such that the DM RS is transmitted only in a resource region scheduled for the specific UE, that is, only in a time-frequency region carrying data for the specific UE.

Figure 7:
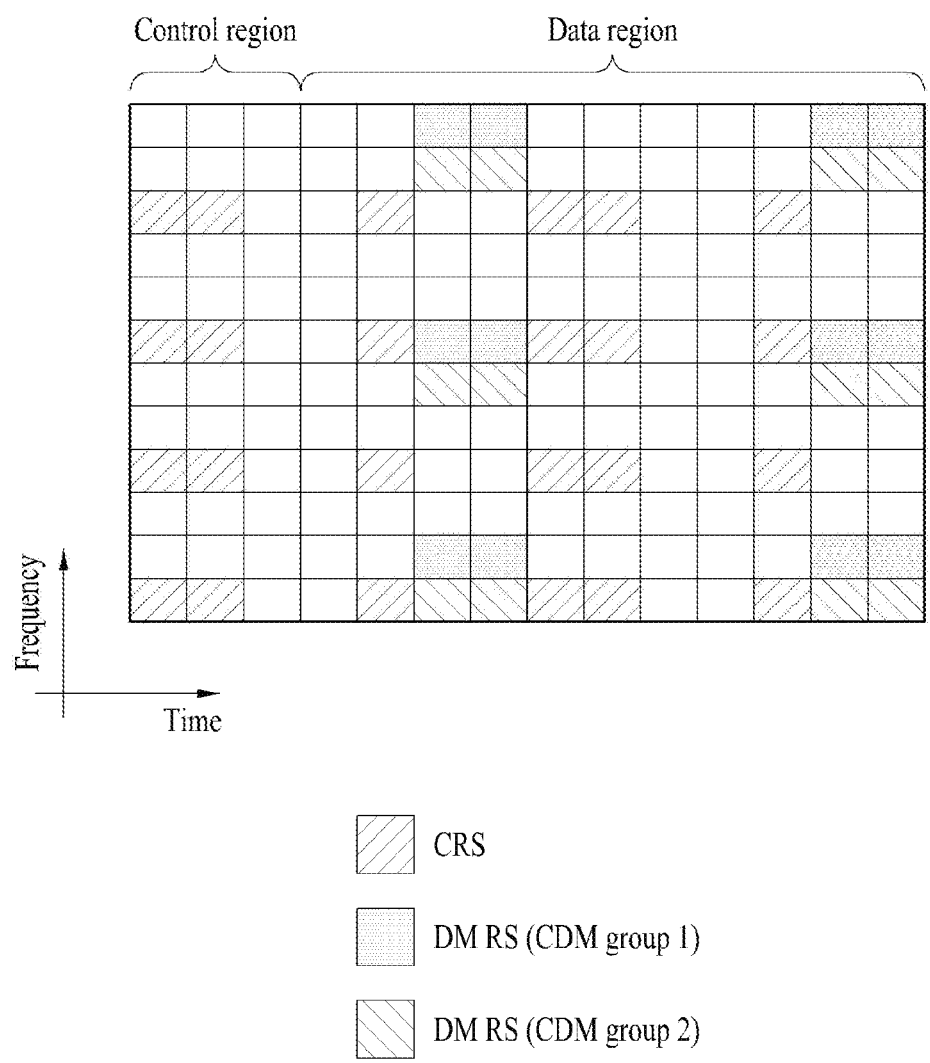
FIG. 7 is a diagram illustrating an exemplary DM RS pattern defined for the LTE-A system.

FIG. 7 is a diagram illustrating an example of a DM RS pattern defined in the LTE-A system. FIG. 7 shows the positions of REs carrying DM RSs in one resource block in which downlink data is transmitted (in the case of the normal CP, one resource block includes 14 OFDM symbols in the time domain×12 subcarriers in the frequency domain). The DM RSs may be transmitted for four antenna ports (antenna port indices 7, 8, 9 and 10), which are additionally defined in the LTE-A system. The DM RSs for different antenna ports may be distinguished with each other by different frequency resources (subcarriers) and/or different time resources (OFDM symbols) at which they are located. (i.e., the DM RSs may be multiplexed according to an FDM and/or TDM scheme). In addition, the DM RSs for different antenna ports located on the same time-frequency resources may be distinguished by orthogonal codes (i.e., the DM RSs may be multiplexed according to a CDM scheme). In the example of FIG. 7, DM RSs for antenna ports 7 and 8 may be located at REs expressed as DM RS CDM group 1 and they may be multiplexed by orthogonal codes. Similarly, in the example of FIG. 7, DM RSs for antenna ports 9 and 10 may be located at REs expressed as DM RS CDM group 2 and they may be multiplexed by orthogonal codes.

Figure 8:
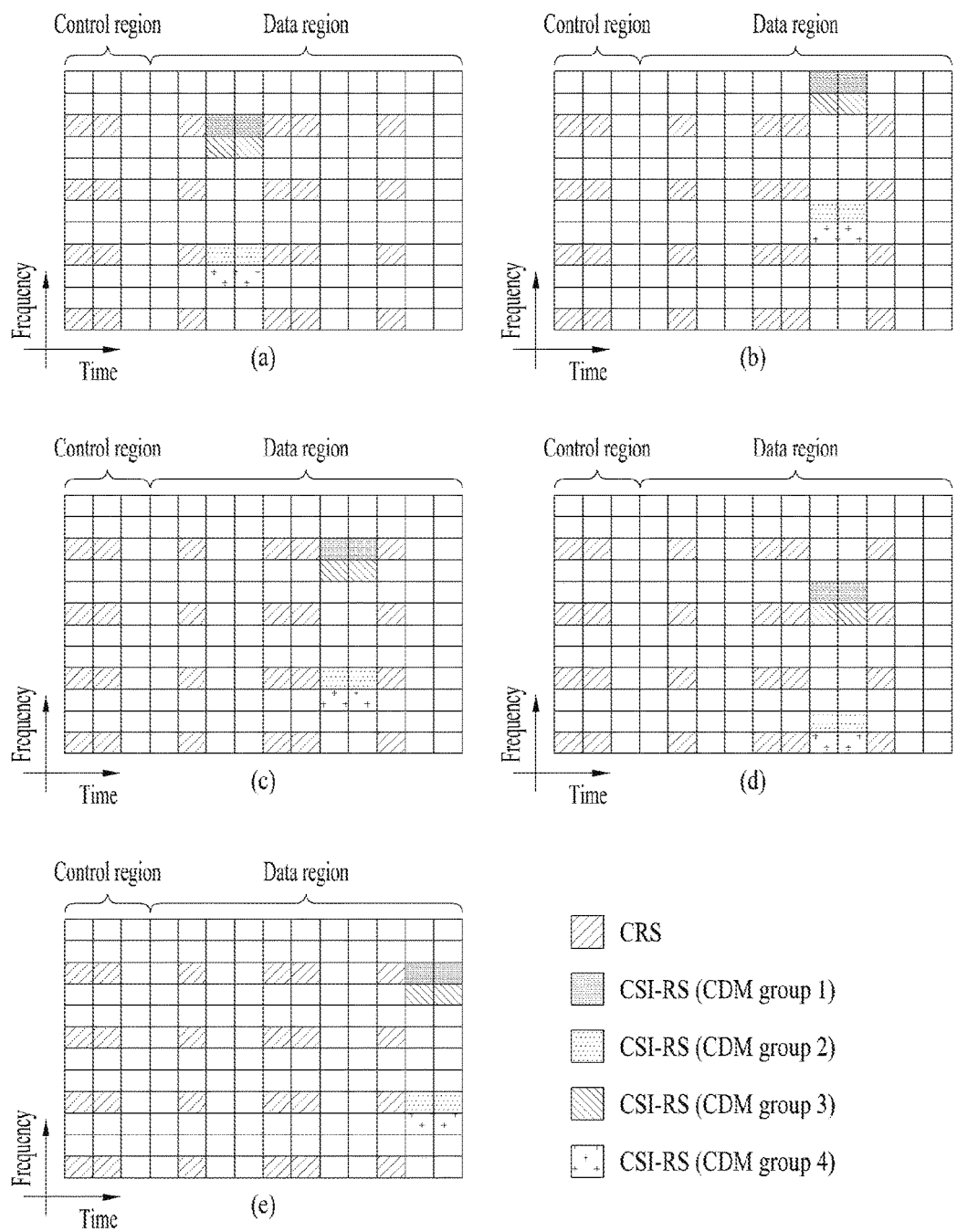
FIG. 8 is a diagram illustrating exemplary CSI-RS patterns defined for LTE-A system.

FIG. 8 is a diagram illustrating examples of a CSI-RS pattern defined in the LTE-A system. FIG. 8 shows the positions of REs carrying CSI-RSs in one resource block in which downlink data is transmitted (in the case of the normal CP, one resource block includes 14 OFDM symbols in the time domain×12 subcarriers in the frequency domain). One of the CSI-RS patterns shown in FIGS. 8(a) to 8(e) may be used in any downlink subframe. The CSI-RSs may be transmitted for 8 antenna ports (antenna port indices 15, 16, 17, 18, 19, 20, 21, and 22) additionally defined in the LTE-A system. The CSI-RSs for different antenna ports may be distinguished with each other by different frequency resources (subcarriers) and/or different time resources (OFDM symbols) at which they are located. (i.e., the CSI-RSs may be multiplexed according to the FDM and/or TDM scheme). The CSI-RSs for different antenna ports located on the same time-frequency resources may be distinguished by orthogonal codes (i.e. The CSI-RSs may be multiplexed according to the CDM scheme). In the example of FIG. 8(a), CSI-RSs for antenna ports 15 and 16 may be located at REs expressed as CSI-RS CDM group 1 and they may be multiplexed by orthogonal codes. In the example of FIG. 8(a), CSI-RSs for antenna ports 17 and 18 may be located at REs expressed as CSI-RS CDM group 2 and they may be multiplexed by orthogonal codes. In the example of FIG. 8(a), CSI-RSs for antenna ports 19 and 20 may be located at REs expressed as CSI-RS CDM group 3 and they may be multiplexed by orthogonal codes. In the example of FIG. 8(a), CSI-RSs for antenna ports 21 and 22 may be located at REs expressed as CSI-RSs CDM group 4 and they may be multiplexed by orthogonal codes. The same principle as described with reference to FIG. 8(a) may be applied to FIGS. 8(b) to 8(e).

Figure 9:
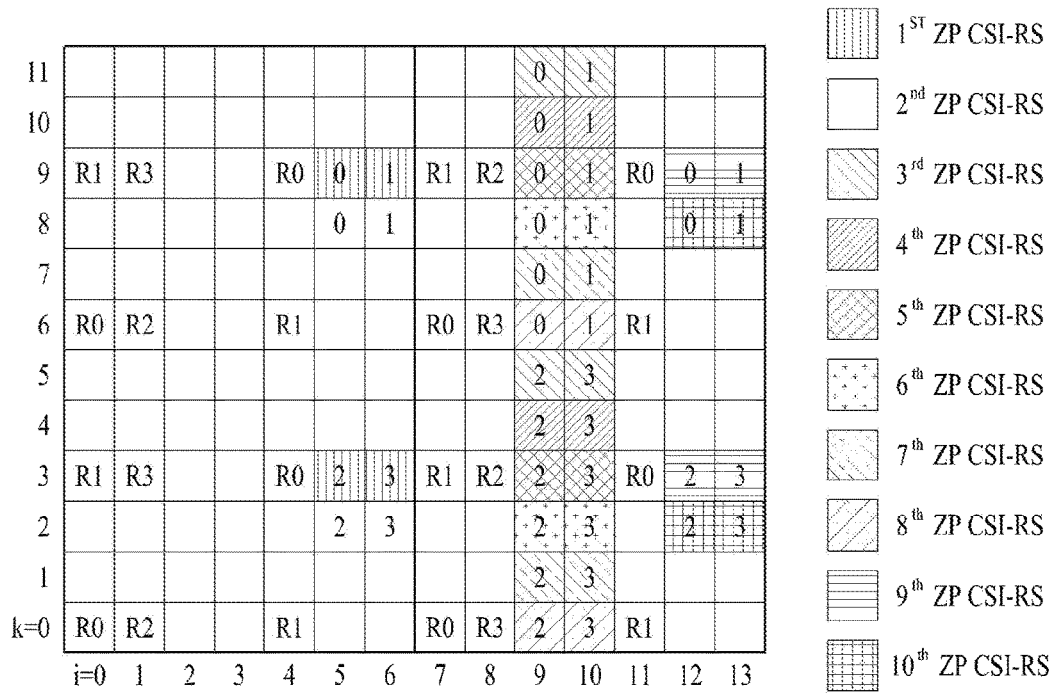
FIG. 9 is a diagram illustrating an exemplary zero-power (ZP) CSI-RS pattern defined for the LTE-A system.

FIG. 9 is a diagram illustrating an example of a zero-power (ZP) CSI-RS pattern defined in the LTE-A system. There are two main purposes of a ZP CSI-RS. First of all, the ZP CSI-RS is used for CSI-RS performance improvement. That is, in order to improve performance of measurement for CSI-RS of a different network, a network may perform muting on a CSI-RS RE of the different network and then inform a UE in the corresponding network of the muted RE by setting it to the ZP CSI-RS in order for the UE to perform rate matching correctly. Second, the ZP CSI-RS is used for the purpose of measuring interference for a CoMP CQI calculation. That is, if a certain network performs muting on a ZP CSI-RS RE, a UE can calculate a CoMP CQI by measuring interference from the ZP CSI-RS.

The RS patterns of FIGS. 6 to 9 are purely exemplary and various embodiments of the present invention is not limited to a specific RS pattern. In other words, even when an RS pattern different from the RS patterns of FIGS. 6 to 9 is defined and used, the various embodiments of the present invention can be applied in the same manner.

Full Duplex Radio (FDR) Transmission

The FDR system means a system that enables a transmitting device to simultaneously perform transmission and reception through the same resource. For instance, an eNB or a UE supporting the FDR may perform transmission by dividing uplink/downlink into frequency/time without duplexing.

Figure 10:
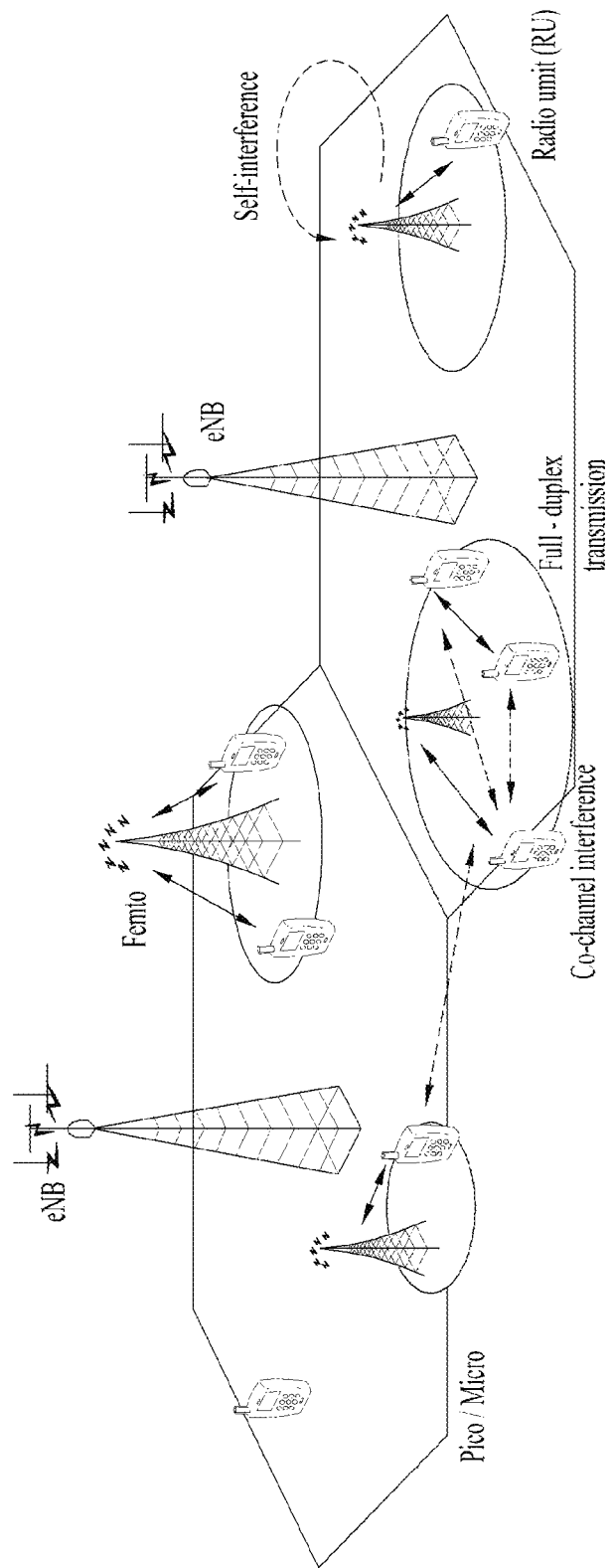
FIG. 10 illustrates an exemplary system supporting FDR transmission.

FIG. 10 illustrates an exemplary system supporting FDR transmission.

There are two types of interference in the FDR system. The first type of interference is self-interference (SI). The SI means that a signal transmitted from a transmitting antenna of an FDR device is received by a receiving antenna of the corresponding FDR device, thereby acting as interference. Such SI can be referred to as intra-device interference. In general, a self-interference signal is received with high power compared to a desired signal. Thus, it is important to cancel the SI through interference cancellation.

Figure 11:
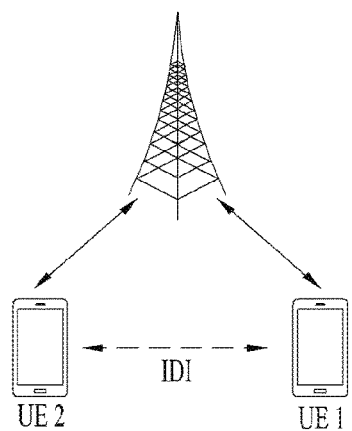
FIG. 11 illustrates inter-device interference (IDI).

The second type of interference is inter-device interference (IDI) shown in FIG. 11. The IDI means that a UL signal transmitted by an eNB or a UE is received by a neighboring eNB or another UE, thereby acting as interference.

The SI and IDI occurs only in the FDR system because the same resource is used in a cell. Since half-duplex (e.g., FDD, TDD, etc.) in which frequency or time is allocated for each of uplink and downlink has been used in the legacy communication system, interference has not been occurred between uplink and downlink. However, in an FDR transmission environment, since the same frequency/time resource is shared between uplink and downlink, the above-mentioned interference occurs.

For convenience of description, the present invention will be described based on the IDI.

FIG. 11 is a reference diagram for explaining the IDI. Referring to FIG. 11, since the same radio resource is used in a single cell, the IDI occurs only in the FDR system. FIG. 11 is a diagram illustrating the concept of the IDI caused when an eNB uses full-duplex (FD) mode (i.e., mode for simultaneously performing transmission and reception using the same frequency) on the same resource. Although FIG. 11 shows only two UEs for convenience of description, it is apparent that the present invention can be applied to a case where two or more UEs exist.

In the legacy communication system, since signal transmission and reception is performed using FDD (frequency division duplex) or TDD (time division duplex), i.e., different resources are used for the signal transmission and reception, the IDI does not occur. Although interference from a neighboring cell, which occurs in the legacy system, is also present in the FDR system, it is not described in the present invention for convenience of description.

Figure 12:
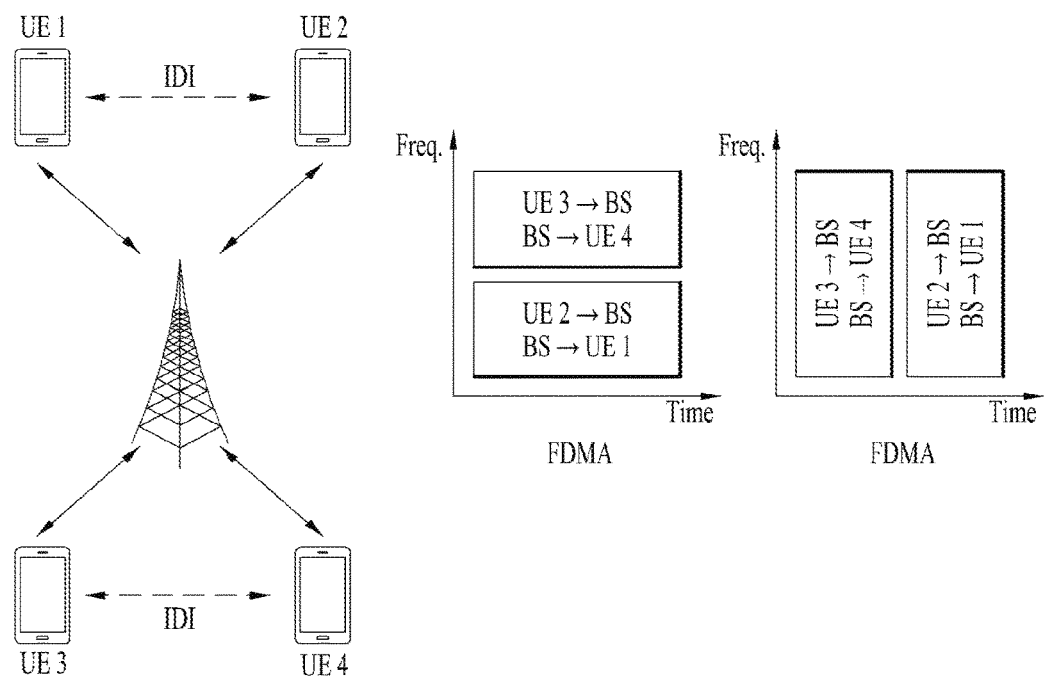
FIG. 12 illustrates multi-access performed by user equipments in the FDR system.

FIG. 12 is a reference diagram for explaining multi-access performed by UEs in the FDR system. Referring to FIG. 12, not only an FD scheme operated on the same resource but also an FD scheme operated on different resources may be present in the FDR system. FIG. 12 illustrates exemplary FDMA and TDMA operations when an eNB operates in FD mode on the same resource and a plurality of UEs perform multi-access.

In addition, the present invention assumes that a TDD system using FD communication on the same resource adopts a frame configuration for measuring interference between unsynchronized devices and a configuration for trying to transmit and receive signals for identifying devices. Based on the above assumption, simultaneous transmission and reception can be enabled in a single cell according to a UE-specific configuration where a different configuration is allocated to a UE in each cell.

According to the present invention, after IDI is measured, a unique signature can be assigned to each UE or each UE group to reduce or cancel the measured IDI. In this case, a signal capable of identifying an interference-causing UE for interference measurement is referred to as the signature signal.

Thus, by receiving the signature signal, a UE can obtain a signal strength of an IDI-causing UE, a UE or signature index, a channel vector such as a phase, timing information, etc. In addition, the signature signal may be implemented in any form capable of identifying a UE or a UE group, for example, as a code sequence or a puncturing pattern. That is, unique scrambling or interleaving may be applied to the UE/UE group using the code sequence. Moreover, to facilitate interference measurement at a receiving UE, the signature signal may be transmitted from a single UE/UE group in an exclusive manner. In this case, a minimum unit configured for the exclusive operation may be one OFDM symbol.

For example, assuming that a sequence of the signature signal is mapped to one OFDM symbol and then transmitted, an index of a sequence to be transmitted by each UE can be calculated through a UE ID. In other words, the sequence of the signature signal can be expressed as a function of the UE ID. If a size of data constituting the UE ID is greater than the sequence index, the index can be calculated based on modular operation as shown in Equation 12.

Equation 12

$$\text{Sequence Index} = (\text{UE ID}) \bmod (\text{Total index number}) \quad \text{[Equation 12]}$$

According to an embodiment, to distinguish between signature signals, an m-sequence may be configured using the UE ID or the sequence index. In a secondary synchronization signal (SSS) of the LTE system, an m-sequence shown in Equation 13 is used.

Equation 13

$$m_0 = m' \bmod 31$$
$$m_1 = (m_0 + \lfloor m'/31 \rfloor + 1) \bmod 31 \quad \text{[Equation 13]}$$
$$m' = N_{ID}^{(1)} + q(q+1)/2, \quad q = \left\lfloor \frac{N_{ID}^{(1)} + q'(q'+1)/2}{30} \right\rfloor,$$
$$q' = \lfloor N_{ID}^{(1)}/30 \rfloor$$

The UE ID or the sequence index is used for $N^{(1)}_{ID}$, m' is obtained from the $N^{(1)}_{ID}$, and the signature signal is distinguished from another one.

Hereinafter, details of IDI measurement will be described. The IDI is caused by use of the same resource. For example, if the number of IDI-causing UEs and the number of IDI-measuring UEs are N, the IDI measurement should be performed ($_NC_2*2$) times. In the FDR system, since frequency and transmission time in uplink is equal to that in downlink, channel reciprocity can be allowed between transmitting and receiving devices.

In a system using full-duplex communication on the same resource, UEs can be grouped to facilitate control of interference between UEs (i.e., IDI), i.e., to avoid or mitigate the IDI. The present invention defines a method for reducing the number of times of IDI measurement when a UE group is updated periodically or if necessary. For example, it is possible to define a scheme for allowing UEs to generate measurement configurations by considering channel reciprocity instead of receiving the configurations from an eNB. In addition, it is also possible to define a grouping method for scheduling IDI-causing UEs in the FDR system and an IDI measurement and reporting method for grouping. For instance, UEs may be grouped based on the amount of IDI measured by each UE. Moreover, a method for grouping UEs based on the amount of IDI by considering IDI cancellation/mitigation capability of each UE instead of using the number of UEs sharing the same resources may be applied. Furthermore, according to the present invention, it is possible to define a method for measuring and reporting low complexity of IDI when a configured group is updated either periodically or aperiodically. For example, each UE may determine a basic subframe configuration pattern based on the number of times of IDI measurement required in a UE group to which the corresponding UE belongs and then perform IDI measurement as many as times as the UE is assigned, by applying a UE-specific shift value.

In the TDD system, since uplink/downlink frequency is the same, channel reciprocity is allowed between transmitting and receiving devices. The channel reciprocity is also allowed in the FDR system with the same reason. That is, IDI can be measured by one of a UE pair having valid channel reciprocity rather than all UEs.

FIG. 13 is a diagram for explaining an exemplary IDI measurement method applicable to the present invention. Specifically, FIG. 13 shows a subframe configuration according to an embodiment of the present invention.

According to the present embodiment, an eNB can inform all UEs of a UL/DL subframe configuration. For example, in the case (a) of FIG. 13, all UEs may have the same number of times of measurement. In addition, in a time unit (e.g., one subframe) for measurement, only one target UE may be assigned a UL subframe and the remaining UEs may be assigned a DL subframe.

When UEs have the same measurement load, the eNB may transmit the subframe configuration as follows. The eNB may transmit a basic subframe pattern and cyclic shift values for the corresponding pattern to the UEs. For example, when the basic subframe pattern is [U, D, D, D, D], UE A may use the basic subframe pattern as it is and in this case, a cyclic shift value for the UE A becomes 0. If a cyclic shift value for UE B is set to 1, a subframe pattern for the UE B may be determined as [D, U, D, D, D] by shifting the basic subframe pattern to the right by 1. As described above, the eNB may determine the subframe configuration for the UE A and then use UL subframe shift values.

The FDR system means a system capable of supporting simultaneous transmission and reception using the same time and frequency resources. For example, as shown in FIG. 13, UE1 may perform UL operation and UE2 may perform DL operation at the same time. In other words, a UE supporting the FDR transmission means a UE capable of supporting both UL transmission and DL transmission.

As described above, it is possible to select a UE that will share resources with another UE based on the amount of IDI obtained by measurement of the IDI. In addition, considering that an appropriate IDI cancellation scheme is selected and applied depending on the IDI amount, resource sharing is fundamental to minimize the impact of the IDI. Therefore, the present invention proposes a method for performing accurate resource allocation and IDI avoidance by allowing UEs that shares resources depending on the amount of IDI to obtain information on IDI channels. For example, an eNB may design a precoder using measured IDI channel information and the precoder may reduce a burden of the IDI cancellation or enable the IDI avoidance.

In the legacy communication system, DL and UL resources are allocated for signal transmission between an eNB and a UE. However, in the FDR system, since IDI occurs between UEs as shown in FIG. 11, a resource allocation method is required to transmit a signal for measuring the IDI.

In a device-to-device (D2D) system, a UE can transmit information to another UE using DL resource allocation similar to an eNB. However, in the FDR system, since an IDI-causing UE transmits information to an eNB in UL, the IDI occurs. Thus, an IDI measurement signal should be reflected in UL resource allocation.

The present invention proposes a method for transmitting a signal for measuring an IDI channel of the FDR system and resource allocation method therefor.

In FIG. 11, an IDI-causing UE transmits information to an eNB based on UL resource allocation and an IDI-receiving UE (i.e., an IDI victim UE) receives information from the eNB based on DL resource allocation. That is, resources that can be simultaneously transmitted and received by the UL and DL UEs should be used to measure IDI. Therefore, an IDICSI-RS (inter-device interference channel state information-RS) corresponding to an IDI measurement signal and a ZP-IDICSI-RS (zero-power IDICSI-RS) for receiving the IDICSI-RS can be allocated as shown in FIG. 14. Hereinafter, the IDI-causing UE is referred to as an interfering UE and the IDI victim UE is referred to a measuring UE. In addition, the IDICSI-RS for the IDI measurement is referred to as an interference reference signal and the ZP-IDICSI-RS is referred to as an interference measurement signal.

Since UEs operating in FDR mode, i.e., UEs that are served by an eNB operating in FD mode and use the same frequency/time resources may cause interference, the corresponding UEs need to transmit interference measurement signals. Meanwhile, other UEs except UEs that transmit reference signals at the corresponding time measure interference by receiving the interference reference signals.

Hereinafter, a description will be given of an interference reference resource on which an interference reference signal is transmitted and an interference measurement resource reserved for interference measurement. FIG. 14 is a diagram illustrating interference reference resources and interference measurement resources. Specifically, FIG. 14 (a) shows a DL interference measurement resource where an interference measurement signal, which is used by a measuring UE to measure IDI, is mapped and FIG. 14 (b) shows an UL interference reference resource where an interference reference signal is mapped.

For the interference reference signal and the interference measurement signal, resource elements (REs) located at the same position are used. Here, the same position may imply that not only frequency resources are located at the same position but also time resources are located at the same position. Alternatively, the same position may imply that either frequency resources are located at the same position or time resources are located at the same position.

Referring to FIGS. 14 (a) and (b), the interference reference signal is used in a PUSCH region and the interference measurement signal is used in a PDSCH region. Therefore, a resource mapping scheme shown in FIG. 14 can easily support backward compatibility.

The interference measurement resource may imply a region where the eNB allocates zero-power to a corresponding RE to allow the IDI-measuring UE to measure the interference reference signal instead of receiving a DL signal from the eNB when the IDI-causing UE transmits the interference reference signal. In addition, the interference measurement resource may imply a region where the interference measurement signal is transmitted without data transmission. The reason for setting the region where the interference measurement signal is transmitted as a zero-power region is to accurately measure interference by identifying UEs. If there is a UE that intends to measure the interference reference signal, the eNB may transmit configuration information of the interference reference signal to the corresponding measuring UE through higher layer signaling.

Referring to FIG. 14 (a), the interference measurement resource may be configured in a PDSCH region of a DL subframe. The interference measurement resource may be mapped to a region except reference resources defined in the LTE system among the remaining REs excluding a PDCCH for carrying control information. Specifically, the interference measurement resource may be mapped to a partial region selected from the remaining region except a region where a CRS, a CSI-RS, and a DM-RS are transmitted.

As shown in FIG. 14 (a), the interference measurement resource may be mapped to at least one symbol on a time axis among the remaining symbols except a symbol to which a demodulation reference signal or a channel state information reference signal is mapped. In addition, the interference measurement resource may be mapped to at least one subcarrier on a frequency axis among the remaining subcarriers except a subcarrier where a common reference signal is mapped.

More specifically, the interference measurement resource may be configured in symbols with indices #4, #7, #8, and #11 in a subframe starting with symbol index #0. In addition, the interference measurement resource may be transmitted in first, second, fourth, fifth, seventh, eighth, tenth, eleventh subcarriers in each symbol. The interference measurement signal may be mapped to the interference measurement resource and then transmitted. The measuring UE may consider that the interference measurement signal is transmitted with zero power in the interference measurement resource region or the eNB transmits no signal in the corresponding region, and then measure IDI.

Referring to FIG. 14 (b), the interference reference signal and the interference measurement signal can be transmitted using REs located at the same position as described above. Specifically, the interference reference resource for transmission of the interference reference signal can be configured with respect to a UL subframe but it can be mapped in consideration of a reference signal location in a DL subframe. The interference reference resource may be mapped may be mapped to at least one symbol on the time axis among the remaining symbols except the symbol to which the demodulation reference signal or the channel state information reference signal is mapped. In addition, the interference reference resource may be mapped to at least one subcarrier on the frequency axis among the remaining subcarriers except the subcarrier where the common reference signal is mapped.

Specifically, the interference reference resource may be configured in symbols with indices #4, #7, #8, and #11 in the subframe starting with symbol index #0. In addition, the interference measurement resource may be transmitted in the first, second, fourth, fifth, seventh, eighth, tenth, eleventh subcarriers in each symbol. The interference reference signal may be mapped to the interference reference resource and then transmitted. The measuring UE may measure the IDI based on the interference reference signal, which is transmitted together with the interference measurement signal on the same resource.

The measuring UE can obtain the amount of interference by measuring the interference reference signal in the interference measurement resource region.

Meanwhile, the configuration information of the interference reference signal can be designed as follows. The interference reference signal according to the present invention shall be designed for the purpose of measurement for channel estimation, similar to the CSI-RS. That is, since the interference reference signal is transmitted to obtain channel state information only, it is not transmitted in every subframe unlike the CRS. In addition, considering that CSI-RS configuration information is signaled through higher layer signaling according to the LTE-A standards, configuration information for the interference reference signal (hereinafter referred to as interference reference signal configuration information) can be signaled in the same way.

Similar to the CSI-RS, an allocation method for the interference reference signal may be changed depending on the number of antenna ports. For example, if there are two antenna ports, two REs may be allocated for the interference reference signal. If there are four antenna ports, four REs may be allocated for the interference reference signal. As described above, REs can be allocated for transmission and reception of the interference reference signal depending on interfering UEs. That is, the CSI-RS is a cell-specific RS, whereas the interference reference signal may be a UE-specific RS.

Meanwhile, a duty-cycle based CSI-RS can be periodically allocated in DL. However, in the FDR system, since DL/UL subframe allocation may not be fixed in each TTI, it may be difficult to periodically allocate the interference reference signal to a UL subframe. Thus, the present invention propose that an eNB notifies an interference reference signal allocation time according to the following methods.

FIG. 15 is a diagram for explaining a method of notifying an interference reference signal allocation time according to an embodiment of the present invention.

Specifically, FIG. 15 illustrates IDI-causing subframe configurations. In addition, FIG. 15 (a) illustrates configurations (configurations #1, #3, and #4 of FIG. 2) where the number of minimum change points in the conventional communication system is reflected, whereas FIG. 15 (b) illustrates configurations where not only the number of the minimum change points is reflected but also subframes are shifted to distribute U subframes as equally as possible. Compared to FIG. 15 (a), in FIG. 15 (b), a shift value of 0 is applied to configuration #3, a shift value of 3 is applied to configuration #4, and a shift value of 5 is applied to configuration #5.

In FIG. 15 (a), a UE that uses configuration #5 receives IDI from UEs that use configurations #3 and #4 due to subframe #3. However, in FIG. 15 (b), a UE receives IDI from at most one UE with respect to all configurations. In addition, in FIG. 15 (a), the UE that uses configuration #5 may use FD mode only in subframe #3 or #4 due to other UEs, whereas in FIG. 15 (b), the FD mode can be used in subframes except subframes #0, #1, #8 and #9.

Hereinafter, an embodiment in which the eNB notifies the interference reference signal allocation time will be explained with reference to FIG. 15.

If DL, special, UL subframes are consecutively allocated similar to the conventional system, the eNB may allocate the interference reference signal to the UL subframe located next to the special subframe. However, to this end, a DL subframe should exist together with the UL subframe at the same time.

Referring to FIG. 15 (b), in the case of subframe configuration #3, subframes #0, #1, and #2 are respectively set to DL, special, UL subframes. In addition, since subframe #2 of each of subframe configurations #4 and #5 is set to a DL subframe, the interference reference signal may be allocated to subframe #2 corresponding to a UL subframe based on configuration #3. In other words, the eNB may allocate the interference reference signal to the UL subframe with subframe index #2.

On the other hand, in FIG. 15 (a), since subframes #0, #1, and #2 of each of subframe configurations #3, #4, and #5 are respectively set to DL, special, UL subframes, the UL subframe with subframe index #2 may be excluded from an allocation candidate for the interference reference signal.

As another embodiment for determining the interference reference signal allocation time, an allocation time for each IDI-causing UE can be determined using a timer in the eNB. For example, an allocation period is defined as P. If the interference reference signal is allocated at a time T1 for UE A, the interference reference signal is not allocated in a UL subframe placed within the period P from the time T1. Instead, the interference reference signal may be allocated in a UL subframe that first appears after elapse of the period P. This is because if a time T2 at which the UL subframe that first appears after elapse of the period P from the time T1 is significantly greater than (T1+P), IDI may not occur between (T1+P) and T2 and thus, the IDI measurement signal does not need to be transmitted.

The allocation period P may be commonly applied to all UEs. However, when UEs have different channel states, for example, a certain UE may have a slowly changed channel, the UEs may have different P values. When the amount of IDI is measured to allocate the same resources, the eNB may initialize the timer for UEs that use the same resources.

However, if UL subframes are allocated to all the UEs that use the same resources at a specific time, IDI may not occur and thus, the eNB may not allocate the interference reference signal to the corresponding UL subframes. For instance, if UL subframes are allocated to all different UEs at a time when a first UL subframe first appears after elapse of the period P, the interference reference signal may be allocated to a second UL subframe which first appears after the first UL subframe.

Meanwhile, when a UE requests the eNB to transmit or retransmit the interference reference signal or when a UE is newly transferred to a measuring UE, the eNB may allocate the interference reference signal to a UL subframe placed within the period P from the time T1.

Regarding the interference reference signal allocation time, if REs are not allocated to a UE due to lack of resources for the interference reference signal, the interference reference signal may be allocated to a UL subframe that first appears after the corresponding UL subframe.

Hereinafter, a method for allocating an interference measurement signal for interference measurement at an interference-receiving UE. Since the interference measurement signal has a relative relation to the interference reference signal in terms of DL, the interference measurement signal may be allocated similar to the interference reference signal.

If DL, special, UL subframes are consecutively allocated similar to the conventional system, the eNB may allocate the interference measurement signal to the DL subframe located before the special subframe. However, to this end, a UL subframe should exist together with the DL subframe at the same time.

Referring to FIG. 15 (b), in the case of subframe configuration #3, subframes #0, #1, and #2 are respectively set to DL, special, UL subframes. In addition, from the perspective of a UE provided with subframe configuration #4 or #5, a UL subframe is present at a time corresponding to subframe #2. Thus, the UE provided with subframe configuration #4 or #5 may instruct to allocate the interference reference signal to the UL subframe with subframe index #2.

On the other hand, in FIG. 15 (a), since subframes #0, #1, and #2 of each of subframe configurations #3, #4, and #5 are respectively set to DL, special, UL subframes, the DL subframe with subframe index #2 may be excluded from an allocation candidate for the interference measurement signal.

As another embodiment for determining the interference measurement signal allocation time, an allocation time for each IDI-measuring UE can be determined using a timer in the eNB. For example, an allocation period is defined as P. If the interference measurement signal is allocated at a time T1 for UE A, the interference measurement signal is not allocated in a DL subframe placed within the period P from the time T1. Instead, the interference measurement signal may be allocated in a DL subframe that first appears after elapse of the period P. This is because if a time T2 at which the DL subframe that first appears after elapse of the period P from the time T1 is significantly greater than (T1+P), there may be no damage caused by IDI between (T1+P) and T2 and thus, the IDI measurement signal does not need to be transmitted.

The allocation period P may be commonly applied to all UEs. However, when UEs have different channel states, for example, a certain UE may have a slowly changed channel, the UEs may have different P values. When the amount of IDI is measured to allocate the same resources, the eNB may initialize the timer for UEs that use the same resources.

If DL subframes are allocated to all the UEs that use the same resources at a specific time, IDI may not occur and thus, the eNB may not allocate the interference measurement signal to the corresponding DL subframes. For instance, if DL subframes are allocated to all different UEs at a time when a first DL subframe first appears after elapse of the period P from the time T1, the interference measurement signal may be allocated to a second DL subframe which first appears after the first DL subframe.

If the eNB allocates the interference reference signal to a UL subframe placed within the period P from the time T1 because a UE requests the eNB to transmit or retransmit the interference reference signal or a UE is newly transferred to a measuring UE, the eNB may not allocate the interference measurement signal for a UE that has received the corresponding interference reference signal within the period P.

The eNB may transmit locations of REs for the interference reference signal to the corresponding UE through higher layer signaling as follows.

Since the eNB is already aware of the UEs that use the same resources, the eNB may fix the locations of the REs where the interference reference signal is allocated for each UE. Such a scheme is suitable when interference reference signal resources are sufficient. However, even when the resources are insufficient, the eNB may determine different fixed locations for UEs having no allocated RE. For example, assuming that there are five UEs (UEs A to E) and the interference reference signal can be simultaneously allocated to a single UL subframe for a total of three UEs, the UL subframe may be reserved for UEs A to C and another subframe may be reserved for UEs D to E.

The eNB may configure the locations of REs where the interference reference signal is allocated in predetermined order and then sequentially allocate the REs for IDI-causing UEs with allocated UL subframes. In this case, the eNB may give a high priority to the UEs having no allocated RE due to lack of resources for the interference reference signal. Alternatively, the eNB may decrease priority in decreasing order of UL subframe allocation intervals. That is, if an allocation period P for UE A is set to 3 and an allocation period P for UE B is set to 5, UE B may have a priority over UE A in resource allocation.

The eNB may transmit locations of REs for the interference measurement signal to the corresponding UE through higher layer signaling as follows.

When the eNB fixes the locations of the REs where the interference measurement signal is allocated for each UE, the eNB may informs a IDI channel measuring UE of the locations of the REs to be measured and/or UEs that transmit interference reference signals. For example, when two UEs transmit interference reference signals, the eNB may inform a measuring UE of indices of the two UE or indices of all possible UE combinations. If a UL subframe is allocated for different UEs, the eNB may inform the IDI channel measuring UE of an index of the corresponding UL subframe. Thereafter, the measuring UE may measure IDI from the UEs corresponding to the received index.

When the locations of REs where the interference measurement signal is allocated are determined in predetermined order, the eNB may sequentially transmit information on interfering UEs corresponding to measurement targets to a measuring UE. In this case, to inform the locations of the REs to be measured and/or UEs that transmit interference reference signals, the eNB may transmit indices of the UEs or indices of all possible UE combinations. Since order needs to be considered, the indices of all possible UE combinations may be doubled compared to the fixed REs. If the eNB allocates interference signals in order of UE A, UE B, and UE C, the eNB may sequentially transmit indices of UE A, UE B, and UE C to a measuring UE. By doing so, the measuring UE may know that IDI measured at individual times sequentially correspond to interference from UE A, UE B, and UE C.

Since the resource allocation method according to the present invention is devised to obtain channel information, it is not limited to one RB but can be extended to a wide band.

Figure 16:
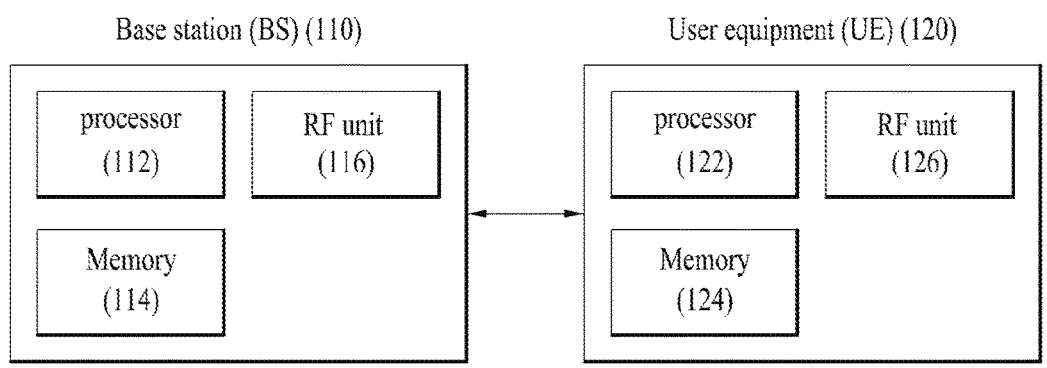
FIG. 16 is a block diagram illustrating a base station and a user equipment applicable to an embodiment of the present invention.

Referring to FIG. 16, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas According to an embodiment of the present invention, the processor 112 maps an interference measurement signal to a measurement subframe and then transmit the signal to a measuring UE. In addition, the processor 112 transmits configuration information on an interference reference signal transmitted in an interference subframe to a receiving UE.

According to an embodiment of the present invention, the processor 122 transmit the interference reference signal based on the configuration information on the interference reference signal. In addition, the processor 122 measures IDI based on the interference reference signal received at a location of an interference measurement resource.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to wireless communication devices such as a user equipment, a relay, and a base station.

What is claimed is:

1. A method for measuring interference from a neighboring user equipment (UE) in a wireless communication system supporting full duplex radio, the method performed by a UE and comprising:
receiving, via higher layer signaling, information related to one or more first locations of an interference measurement resource and an index of the neighboring UE that uses a time-frequency resource used by the UE, wherein a resource block of the time-frequency resource includes 14 OFDM symbols in a time domain and 12 subcarriers in a frequency domain, and the 14 OFDM symbols include symbols from symbol index #0 to symbol index #13, and the 12 subcarriers include subcarriers from subcarrier index #0 to subcarrier index #11, wherein the one or more first locations are selected from among a plurality of first resource elements, and symbol indexes of the plurality of first resource elements include #4, #7, #8 and #11, and subcarrier indexes of the plurality of first resource elements include #1, #2, #4, #5, #7, #8, #10 and #11;
receiving at least one interference measurement signal on the interference measurement resource in a measurement downlink subframe; and
measuring interference from the neighboring UE based on the at least one received interference measurement signal,
wherein data is not received on the interference measurement resource, and
wherein the plurality of first resource elements in the measurement downlink subframe of the UE, correspond to a plurality of second resource elements in a first reference uplink subframe of the neighboring UE, at least one first interference reference signal is transmitted on an interference reference resource of among the plurality of second resource elements from the neighboring UE to the UE to the UE, and the at least one first interference reference signal corresponds to the at least one interference measurement signal.

2. The method of claim 1, further comprising transmitting at least one second interference reference signal for inter-device interference measurement at one or more second locations in a second reference uplink subframe of the UE, wherein the one or more second locations correspond to the one or more first locations of the interference measurement resource.

3. The method of claim 1, wherein the at least one interference measurement signal is received while the at least one first interference reference signal is transmitted by the neighboring UE.

4. The method of claim 3, wherein the at least one interference measurement signal is received while the at least one interference reference signal is transmitted by the neighboring UE, based on information on subframe configurations of both the UE and the neighboring UE, and information on subframe cyclic shifts of both the UE and the neighboring UE.

5. A user equipment (UE) for measuring interference from a neighboring UE in a wireless communication system supporting full duplex radio, the UE comprising:
a transceiver coupled to a processor; and
the processor configured to:
control the transceiver to receive, via higher layer signaling, information related to one or more first locations of an interference measurement resource and an index of the neighboring UE that uses a time-frequency resource used by the UE, wherein a resource block of the time-frequency resource includes 14 OFDM symbols in a time domain and 12 subcarriers in a frequency domain, and the 14 OFDM symbols include symbols from symbol index #0 to symbol index #13, and the 12 subcarriers include subcarriers from subcarrier index #0 to subcarrier index #11, and wherein the one or more first locations are selected from among a plurality of first resource elements, and symbol indexes of the plurality of first resource elements include #4, #7, #8 and #11, and subcarrier indexes of the plurality of first resource elements include #1, #2, #4, #5, #7, #8, #10 and #11;
control the transceiver to receive at least one interference measurement signal on the interference measurement resource in a measurement subframe; and
measure interference from the neighboring UE based on the at least one received interference measurement signal, wherein data is received on the interference measurement resource, and wherein the plurality of first resource elements in the measurement downlink subframe of the UE, correspond to a plurality of second resource elements in a first reference uplink subframe of the neighboring UE, at least one first interference reference signal is transmitted on an interference reference resource of among the plurality of second resource elements from the neighboring UE to the UE, and the at least one first interference reference signal corresponds to the at least one interference measurement signal.

6. The UE of claim 5, wherein the processor is further configured to control the transceiver to transmit at least one second interference reference signal for inter-device interference measurement at one or more second locations in a second reference uplink subframe of the UE, wherein the one or more second locations correspond to the one or more first locations of the interference measurement resource.

7. The UE of claim 5, wherein the at least one interference measurement signal is received while the at least one interference reference signal is transmitted by the neighboring UE.

8. The UE of claim 7, wherein the at least one interference measurement signal is received while the at least one interference reference signal is transmitted by the neighboring UE, based on information on subframe configurations of both the UE and the neighboring UE, and information on subframe cyclic shifts of both the UE and the neighboring UE.

* * * * *